(12) United States Patent
Sammauro

(10) Patent No.: US 9,845,204 B2
(45) Date of Patent: Dec. 19, 2017

(54) LOW PROFILE TRANSFER CONVEYOR FOR USE WITH CONVEYOR SYSTEMS

(71) Applicant: Eaglestone Inc., St. Charles, IL (US)

(72) Inventor: Carmen Sammauro, Lombard, IL (US)

(73) Assignee: EAGLESTONE INC., St. Charles, IL (US)

( * ) Notice: Subject to any disclaimer, the term of this patent is extended or adjusted under 35 U.S.C. 154(b) by 0 days.

(21) Appl. No.: 15/431,695

(22) Filed: Feb. 13, 2017

(65) Prior Publication Data

US 2017/0152113 A1    Jun. 1, 2017

Related U.S. Application Data

(60) Division of application No. 15/143,547, filed on Apr. 30, 2016, now abandoned, which is a continuation-in-part of application No. 14/797,138, filed on Jul. 12, 2015, now Pat. No. 9,327,915.

(51) Int. Cl.
*B65G 15/62* (2006.01)
*B65G 47/52* (2006.01)
*B65G 15/24* (2006.01)
*B65G 47/66* (2006.01)

(52) U.S. Cl.
CPC ............ *B65G 47/52* (2013.01); *B65G 15/24* (2013.01); *B65G 15/62* (2013.01); *B65G 47/66* (2013.01); *B65G 2207/14* (2013.01)

(58) Field of Classification Search
CPC ......... B65G 47/66; B65G 15/08; B65G 15/62
USPC ........................................................ 198/600
See application file for complete search history.

(56) References Cited

U.S. PATENT DOCUMENTS

| 4,142,625 | A | * | 3/1979 | Bourgeois | B65G 37/00 198/570 |
|---|---|---|---|---|---|
| 5,605,222 | A | * | 2/1997 | Huberty | B65G 15/62 198/600 |
| 5,692,597 | A | * | 12/1997 | Ferguson | B65G 15/00 198/841 |
| 5,915,527 | A | * | 6/1999 | Nakamura | B65G 15/62 198/823 |
| 5,967,296 | A | * | 10/1999 | Dolan | B65G 17/08 198/853 |
| 6,361,619 | B1 | * | 3/2002 | Falster | H01L 21/3225 148/33.2 |
| 7,308,979 | B1 | * | 12/2007 | Layne | B65G 17/08 198/600 |
| 7,762,389 | B2 | * | 7/2010 | Lee | B65G 15/60 198/835 |

(Continued)

*Primary Examiner* — Mark A Deuble
(74) *Attorney, Agent, or Firm* — KaJane McManus; John G. Tolomei

(57) ABSTRACT

The low profile transfer conveyor bridges gaps between terminal ends of contiguous multi segment conveyors and provides a driven belt bridge with a length that approximately bridges the space between the flat surfaces of conveyor belt segments of the multi segment conveyors and has a low profile which minimizes any unsupported distance across which articles must cross between conveyor belt segments by providing a small continuous section of driven conveyor belt traversing a flat surface bounded on two sides by small radius edges so the transfer conveyor edges extend almost to the flat surface of the belt segments on opposite sides of the gap that it bridges. At its ends, the belt of the transfer conveyor is driven by one or more drive pulleys.

10 Claims, 12 Drawing Sheets

(56) References Cited

U.S. PATENT DOCUMENTS

| | | | | |
|---|---|---|---|---|
| 9,327,915 | B1* | 5/2016 | Sammauro | B65G 47/66 |
| 2007/0017786 | A1* | 1/2007 | Hosch | B65G 15/62 |
| | | | | 198/841 |
| 2008/0296129 | A1* | 12/2008 | Yagi | B65G 23/22 |
| | | | | 198/779 |
| 2010/0275790 | A1* | 11/2010 | Takai | B65G 15/08 |
| | | | | 99/443 C |

* cited by examiner

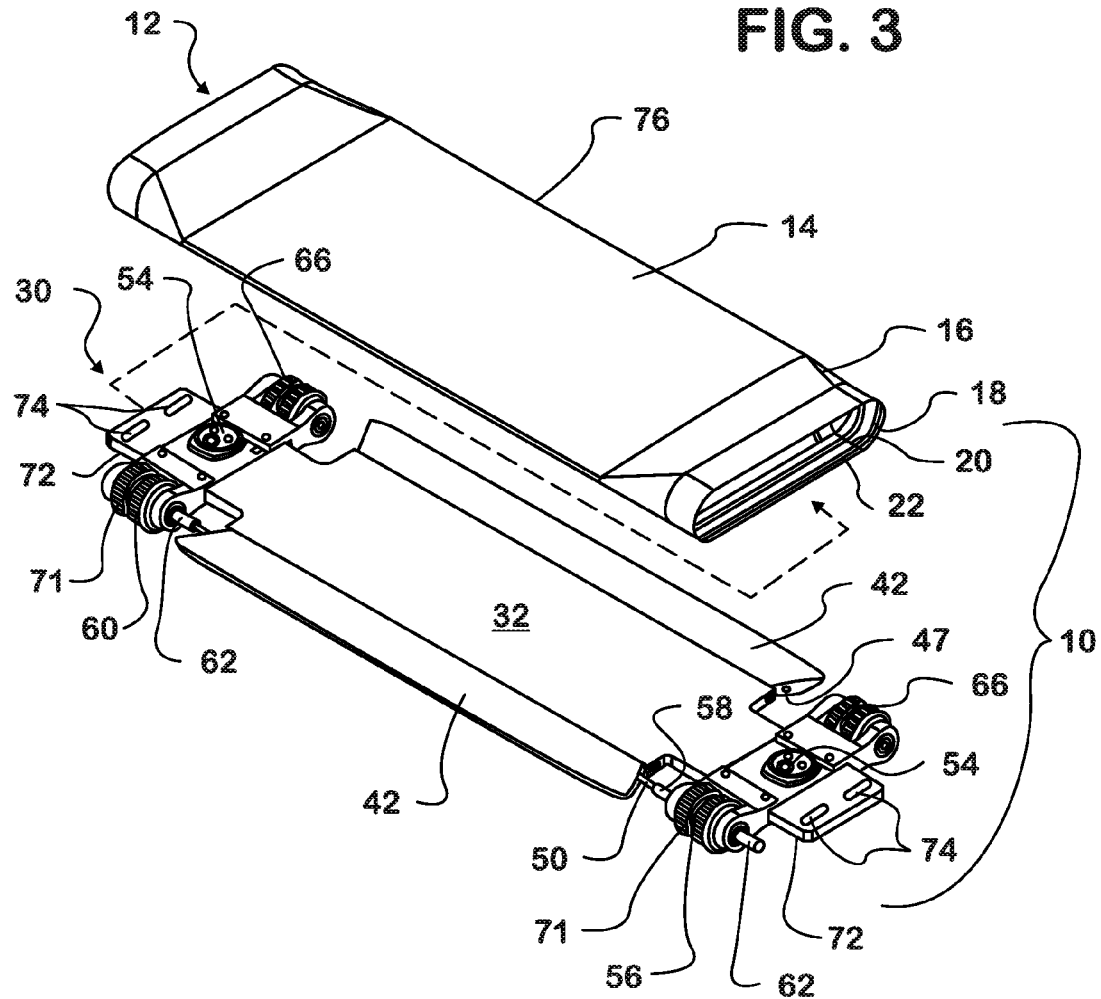

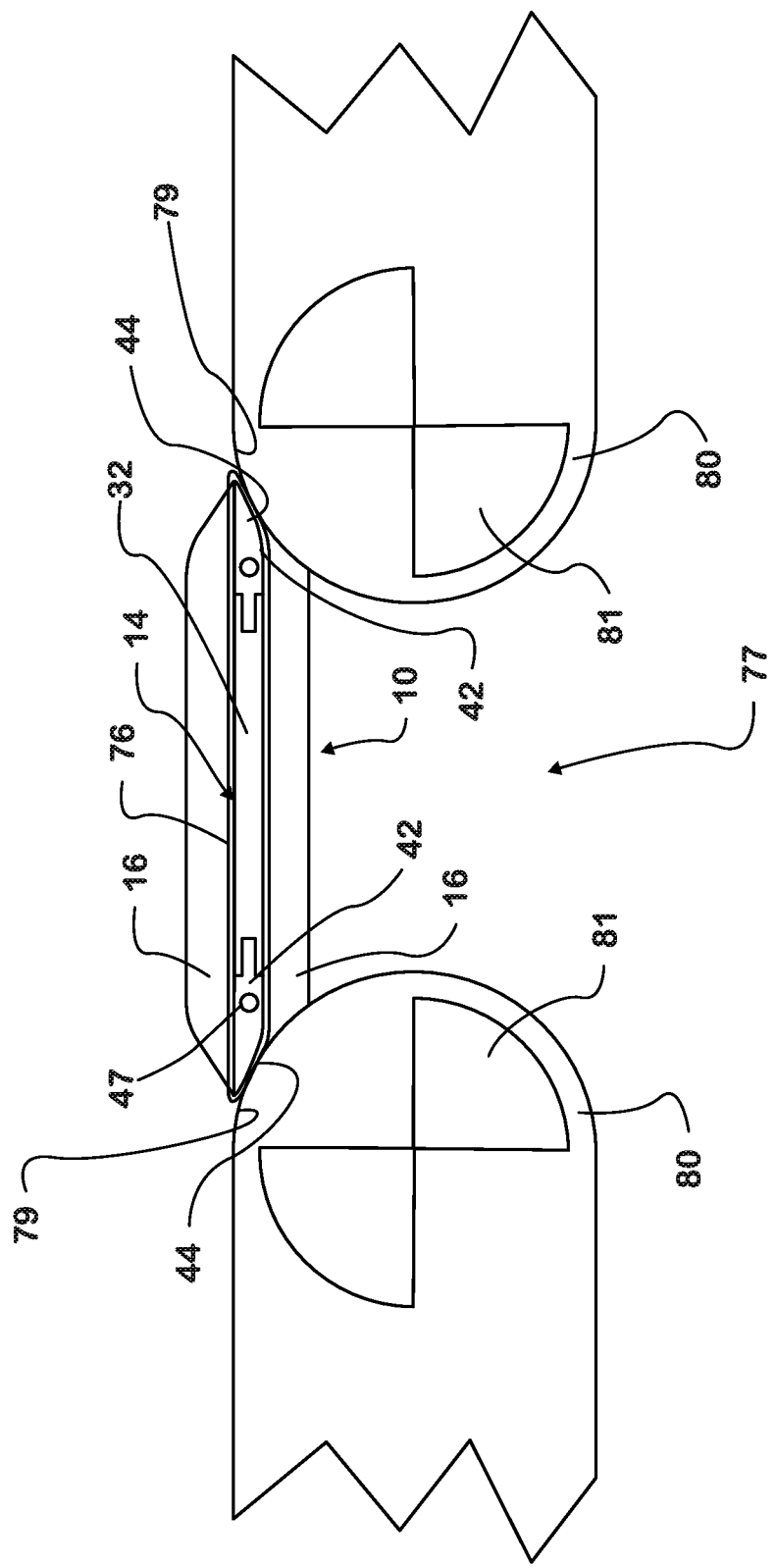

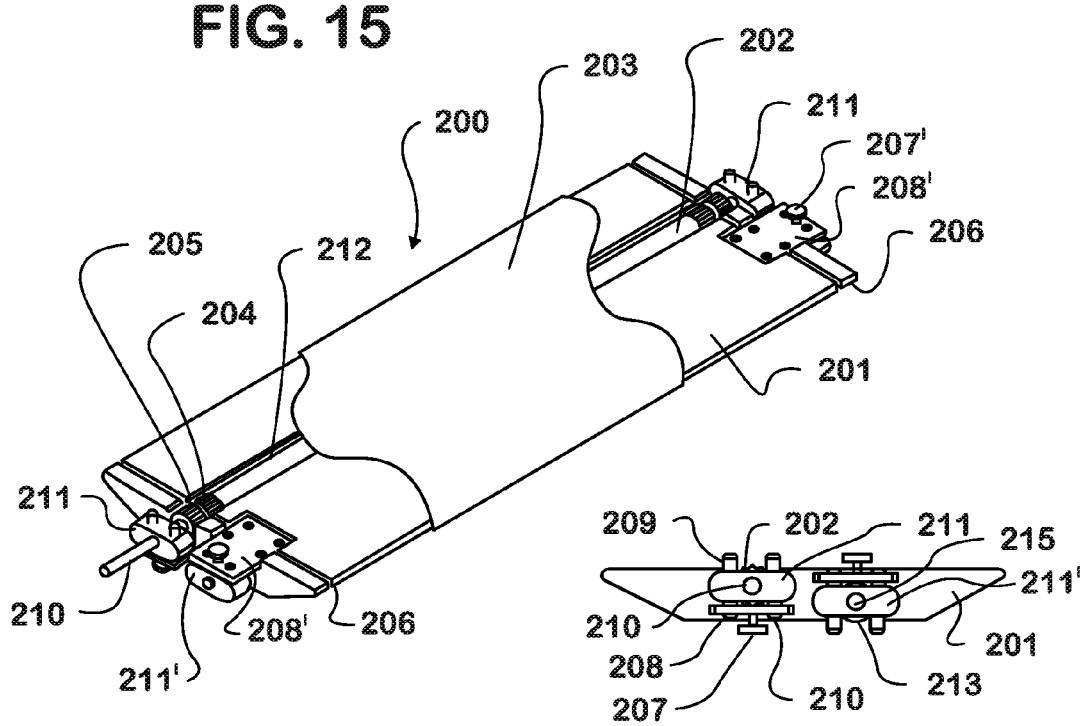
FIG. 15
FIG. 16
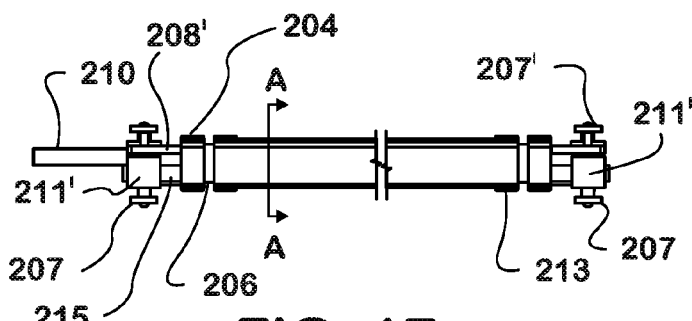
FIG. 17
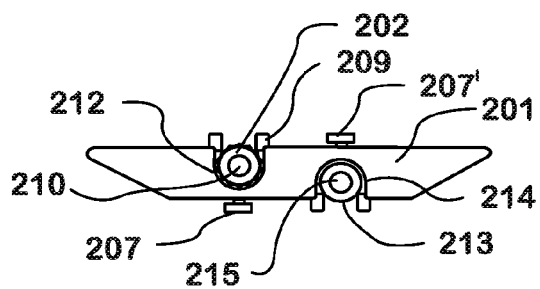
FIG. 18

LOW PROFILE TRANSFER CONVEYOR FOR USE WITH CONVEYOR SYSTEMS

CROSS REFERENCE TO RELATED APPLICATION

This application is a divisional of U.S. application Ser. No. 15/143,547 filed Apr. 30, 2016, allowed. U.S. application Ser. No. 15/143,547 is a continuation in part of U.S. application Ser. No. 14/797,138 filed Jul. 12, 2015, issued as U.S. Pat. No. 9,327,915, the disclosure of which is hereby incorporated by reference in its entirety.

BACKGROUND OF THE INVENTION

Conveyor systems are routinely used to move articles in industrial settings, such as in package handling or in food preparation. These conveyor systems typically consist of a long linear length of belt tightened between two transverse rollers (with transverse or laterally in all cases defined as the perpendicular to the movement of the belt associated therewith) at least one of which drives the belt that moves the articles placed thereon along the path of the belt.

The conveyor systems typically consist of multiple segments of drive belts that carry articles. As the transported articles pass from one conveyor segment to another they must cross a gap between the belts created by the rollers between which the belt of the conveyor belt segment is stretched. The size of the gap between the belts depends on the size of the rollers at the terminal ends of the belt. The larger the roller diameter at terminal ends of contiguous belt segments, the greater the discontinuity between the belt segments. The geometry of the rollers and the necessity to space different belt segments apart can create the opportunity for a significant vertical drop of articles carried by a belt segment as the articles cross the gap to the next belt segment. When an article is relatively small compared to size of the gap it must cross, the article can tip or, worse yet, tumble, as it passes from one belt segment to the next.

Various forms of bridging assemblies are used to prevent the tipping and tumbling of articles as they pass from one conveyor segment to the next. One type of gap filler comprises solid plate sections that bridge the gap to minimize the tumbling of articles as they pass from one conveyor segment to the next. A disadvantage of this type of filler is that articles tend to drag across the top surface or need to be pushed by an adjacent article before moving from one conveyor segment to the next. The dragging of articles over such a plate section poses significant problems where the conveyor segment is required to transport articles at a uniform spacing.

Another type of bridging assembly consists of a much smaller roller or roller belt assembly juxtaposed between the two belt segments. The smaller roller will, to some extent, reduce the potential for downward dropping or tumbling of the article as it passes from one belt to the next but it still does not eliminate the possibility of articles tumbling or tipping.

SUMMARY OF THE INVENTION

According to the invention there is provided transfer conveyor which bridges gaps between terminal roller ends of contiguous multi segment, large conveyors and provides a driven belt bridge having a length for conveying articles that bridges approximately the full space between conveyor belt segments wherein the driven belt or transfer belt has a low profile adjacent to the ends of the large conveyor thereby minimizing any gap between the large conveyors and their terminal rollers. In this manner the transfer conveyor conveys articles between the conveyor segments and prevents their tipping or tumbling. The transfer conveyor may also receive or deliver articles to or from a larger conveyor.

The transfer conveyor has a minor axis that corresponds to the direction that it transports articles and a major axis perpendicular to the minor axis. In all of its arrangements and applications the distance that the transport conveyor transports articles (hereinafter the transport distance) will be less than the distance between the ends of the conveyor in the direction of its major axis. The distance across the belt along its major axis upon which articles may be placed is referred to as it transfer dimension. All use of the term "transverse" refers to a direction parallel to the major axis.

The transfer conveyor terminates at its distal end (defined as its end that is parallel to the major axis) with a belt guide having a very thin outermost edge (or the thin edge) that because of minimal thickness can be located adjacent to the conveying surface of the large conveyor (hereinafter referred to as main conveyor.) The adjacent location of the thin edge refers to a location as near as possible to the conveying surface of the main conveyor.

In most arrangements the transfer belt has a transverse length greater than its transfer dimension to provide an extended end that serves as a drive section A driving force imparted drive section moves the belt in the direction minor axis and produces continuous linear motion of the transfer belt. Using the extended end as a drive section to impart the driving force to transfer belt permits the use of the thin edge at the of the transfer conveyor. The combination of the extended end for driving the transfer belt and the very thin outermost edge achieves the necessary minimization of any gap between the terminal roller of the main conveyor and the thin outermost edge of the transfer conveyor. Minimizing this gap prevent any the tipping or tumbling of conveyed articles as they pass onto and/or off of a main conveyor.

The transfer conveyor may take many forms and serve a variety of applications. The transfer conveyor can provide a flat or arcuate surface that receives articles from and/or delivers articles to the belt of a main conveyor that with respect to the transfer conveyor is much larger overall. An arcuate surface may be convex or concave. In its usual form and application the transfer conveyor fills the gap between large, highly rounded belt ends of adjoining sections of main conveyors created by the large radius of the terminal rollers at their terminal ends. Typically the transfer conveyor provides a moving a flat surface that receives articles from an upstream main conveyor and delivers them to a downstream main conveyor. In other applications the articles may be placed directly upon the transfer conveyor and then delivered to a main conveyor or may receive articles from a transfer conveyor and deliver the articles directly to a processing or packaging step. In certain arrangements the transfer dimension of the transfer conveyor may be greater or smaller than the conveying dimension, i.e. the length across the main conveyor over which articles may be spread transversely.

The thin outermost edge of the transfer conveyor will have a thickness that is much less than the radius of the adjacent end roller of the large conveyor. The thickness of the thin edge will be less than 25% of the radius of any adjacent terminal roller, preferably less than 10% of the radius of the terminal roller and more preferably less than 5% of the radius of the terminal roller. In most cases the thin edge is as near a knife-like as possible while still permitting the continuous movement of the transfer belt over the thin edge. In most cases the thin edge will be in the form of a nose that defines a small radius and is made of a low friction material. This radius will typically range in size from 1/16 to 1/2 inch and preferably 1/16 to 1/4 inch. The nose may comprise a separate structural element of the transfer conveyor or belt guide. In some cases small transversely extending rollers or bearings may be incorporated into the nose to reduce friction as the transfer belt moves over the thin edge or nose.

A variety of suitable drive assemblies can impart the necessary continuous, linear motion to the transfer belt. However, suitable methods cannot use any large rollers at the thin edge of the transfer conveyor. One method of imparting linear motion to the transfer belt uses a transfer belt having a greater total transverse length than the width the transfer dimension provided by the transfer belt so at least one end of the transfer belt extends transversely beyond the portion of the belt surface that receives the conveyed articles and transversely beyond the thin edge over which it passes. This arrangement provides at least one extended end of the transfer conveyor to transition in shape to provide a relatively large interior cross section that can receive a drive roller or a belt pulley. In one arrangement a pair of belt pulleys having a larger diameter than the thin edges of the transfer conveyor each contact the inside of the transfer belt at a drive section. At least one of the belt pulleys serves as a drive pulley and drives the linear motion of the belt. Such pulleys may be provided in the drive section at one end of the transfer belt or the transfer belt may have a drive section on both sides to receive belt pulleys for guiding or driving the transfer belt. Thus in one form the transfer belt comprises a short continuous belt segment having a uniform length stretched over the lateral distance between the thin edges and the transfer belt can extend in the transverse direction past its normal transfer dimension to provide drive sections from the extended section of the transfer belt that contacts a pair of belt pulleys to cause translation of the belt across the transport surface and the thin edges. The term continuous belt refers to a belt that is made in the form of a loop so that it has an endless configuration as move over a surface. In another form the transfer belt may have a greater continuous length at the drive section to accommodate larger belt pulley for driving the transfer belt. In this case the transfer belt has a longer path of travel at its ends than in its middle. In either case, extending the transfer belt past the normal conveyance dimension of the main conveyor belts, provides a section of belt for imparting motion to the transfer belt at a location away from the curvilinear portion of the large conveyor belt segment. Where the drive sections of the transfer belt extend past the transfer dimension, the belt pulleys may have a larger diameter than the thickness of the transfer plate that supports the transfer belt. By locating the belt pulleys where they can have a larger diameter than the short radius edges or even the transfer plate itself, a belt pulley/drive roller can provide the necessary contact and tension to maintain steady continuous movement of the transfer belt on the transport conveyor. The ability to maintain steady continuous movement allows the transfer belt to match the belt speed of the main conveyor or main conveyors that it bridges.

The pulleys, drive rollers or other devices that control the speed of the transfer belt may be timed in any manner that will keep the transfer belt moving at a desired speed with respect to the belt speeds of the main conveyors between which it is located. The speed of the transfer conveyor belt will typically match the speed of the belt of the large conveyors. In some special cases it may be desired to use the transfer conveyor to provide a speed transition where the belts of a main conveyors move at different speeds and the belt of the transfer conveyor moves at an intermediate speed with respect to the difference in belt speed between the two main conveyors.

Any type of drive input may be used to turn pulleys or drive rollers that drive the transfer belt in unison at a desired speed. A simple method is to directly link an end pulley of a main conveyor with a drive pulley of the transfer conveyor by the use of gearing or a drive belt. Sizing of the gears or pulleys for the drive belt can time the relative rotation of the pulley/drive roller as desired to effect the desired linear motion of the transfer belt. Another alternative is to provide an independent drive for a transfer belt pulley/drive roller that has its own speed control for adjusting the linear motion of the transfer belt.

Accordingly in a broad form this invention is a transfer conveyor having a major axis and perpendicularly oriented minor axis that comprises a transfer plate having two belt guides spaced apart from each other in a parallel arrangement by a distance along the minor axis comprising a transport distance with the belt guides located on opposite sides of the transfer conveyor. Each belt guide has an outermost edge over its transverse length and the transfer plate has a depth over its central portion that is less than the distance between the outermost edges. A continuous transfer belt is suspended between the belt guides and arranged for continuous travel over the belt guides with an upwardly oriented surface that provides a transport surface that extending in a transverse direction to define a transversely extending transfer dimension across which articles may be conveyed. The transfer belt has a drive section located at at least one of its ends upon which at least one drive roller is arranged to impart motion to the transfer belt in the minor axis direction of the transfer conveyor. The drive roller has a diameter greater than the outermost edge, is located closer to the center of the transfer surface than the outermost edge and is in contact with an engagement surface that is fixed to or integral with the drive section of the transfer belt to cause the transfer belt to translate over the outermost edges for conveying articles across the transport surface.

In a more specific arrangement of the above broad form the transfer belt transitions in shape from relatively flat at its center to circular at a drive section. The transfer plate defines the shape of the belt by also transitioning from relatively flat at its center to circular at its end that supports the drive section of the transfer belt. The transfer belt has an engagement surface in circular form about its drive section upon which a drive roller acts to cause the transfer belt to translate over the outermost edges. To facilitate placement of the transfer belt over the transfer surface may have section that separate and reattach for placement of the belt over the flat to circular transition of the transfer plate.

In another form the invention comprises a transfer conveyor for bridging the gap between the terminal ends of contiguous multi segment, large conveyors that loop a conveyor belt segment over at least one end roller to transport articles on the conveyors. The transfer conveyor comprises two belt tensioners spaced apart from each other in a parallel arrangement by a distance comprising a transport distance and located on opposite sides of the transfer conveyor with each tensioner having an outermost edge over its transverse length and the outermost edge having an edge thickness that is less than the radius of the end roller. A transfer belt is suspended between the belt tensioners with an upwardly facing belt surface that provides a conveying surface. The transfer belt may have a total transverse length of the belt tensioners to provide a drive section of the transfer belt located to at least one side of the belt tensioners. The transfer conveyor also comprises a pair of pulleys having a diameter greater than the edge thickness and less than the diameter of the end roller that are in contact with the inner surface of the transfer belt at the drive section to impart tension thereon and at least one of the pulleys comprises a drive pulley capable of moving the transfer belt continually over the outermost edges to impart linear motion to the transfer belt and convey articles between the multi segment large conveyors.

In yet another form the invention may comprise a transfer conveyor having a major axis and perpendicularly oriented minor axis comprising a transfer plate having two belt guides spaced apart from each other in a parallel arrangement by a distance along the minor axis comprising a transport distance with the belt guides located on opposite sides of the transfer conveyor with each belt guide having an outermost edge over its transverse length. Again the transfer plate has a depth over its central portion that is less than the distance between the outermost edges. A continuous transfer belt suspended between the belt guides arranged for continuous travel over the belt guides has an upwardly oriented surface that provides a transport surface extending in a transverse direction to define a transversely extending transfer dimension across which articles may be conveyed with said transfer belt having a drive section located at least one of its end. The transfer plate defines one or more pockets at least one end for receiving a captured roller that extends partially in a transverse direction toward the center of the transfer plate.

Alternatively a series of pockets or a continuous groove may extend transversely across the entire transport plate for receiving captured roller segments or a continuous captured roller. Any of the captured rollers may be a drive roller or a follower roller. The necessary motion may be imparted to the belt via one or more captured drive roller, in which case it may not be necessary to have a drive section of the belt that extends past the transfer dimension of the transfer belt. Where the transfer belt does have an extended drive section, one or more drive rollers located above or below the drive section may contact an engagement surface on the exterior of the transfer belt to impart the necessary motion thereto. Where a drive roller cooperates with the exterior of the belt, an additional drive or follower may be positioned opposite the drive roller to balance any force exerted on the drive section.

BRIEF DESCRIPTION OF THE DRAWINGS

FIG. 3 provides an exploded perspective view of the low profile transfer conveyor for bridging multi segment conveyors of the present invention and shows the mechanical body or belt carrying assembly of the invention in its assembled state.

FIG. 5 provides a cross sectional view through a middle section of the low profile transfer conveyor for bridging multi segment conveyors of the present invention in its environment of use.

FIG. 15 is an isometric view of a transfer conveyor with the with end portions of the transfer to show captured rollers that extend the full transverse length of the transfer conveyor.

FIG. 16 is an end view of the transfer conveyor of FIG. 15 with the transfer belt removed.

FIG. 17 is a front view of the transfer conveyor of FIG. 15 with the transfer belt removed.

FIG. 18 is a section view taken at A-A of FIG. 17.

DESCRIPTION OF THE PREFERRED EMBODIMENTS

Figure 1:
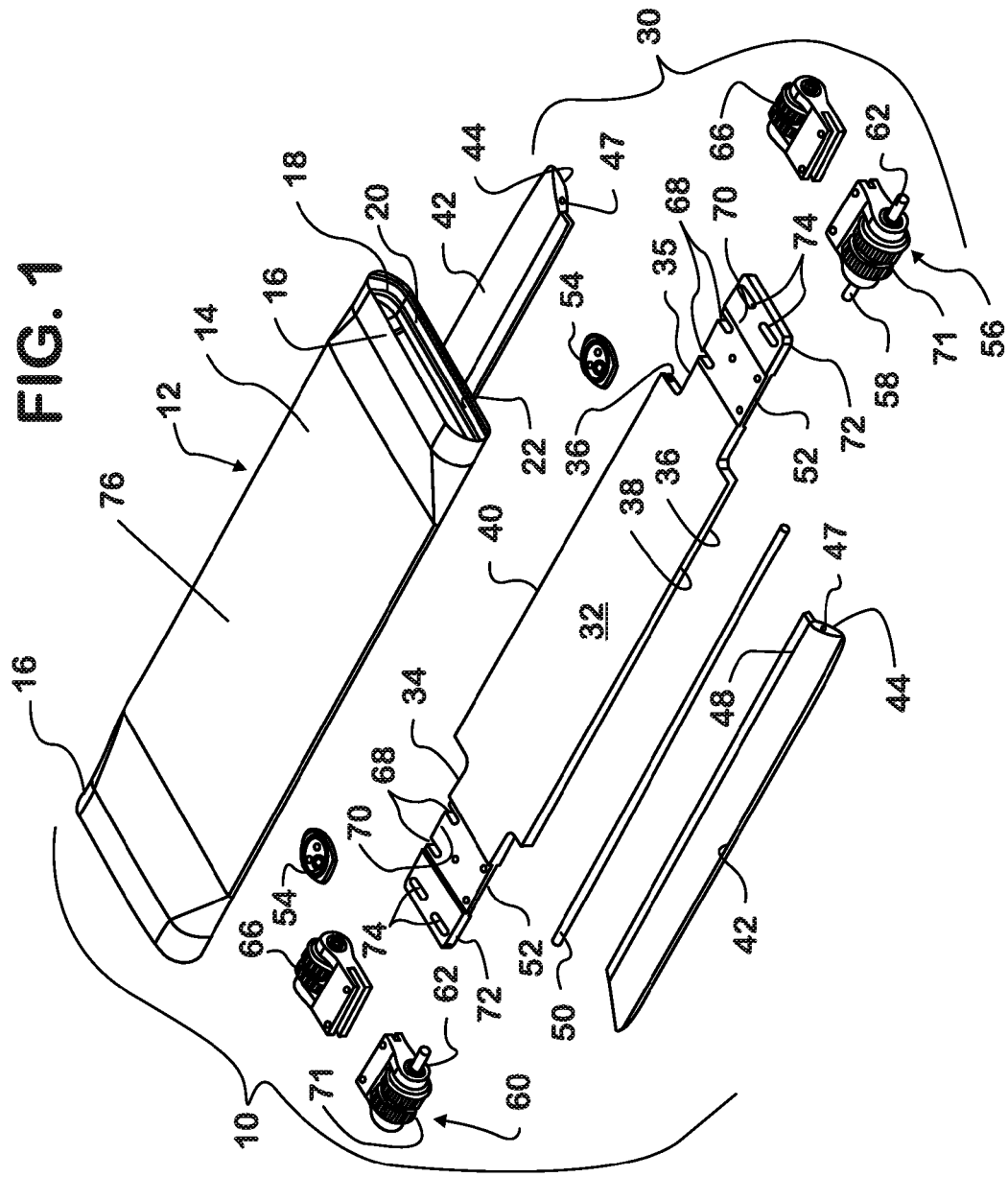
FIG. 1 provides an exploded perspective view of the low profile transfer conveyor for bridging multi segment conveyors of the present invention.

The low profile transfer conveyor for bridging multi segment conveyors of the present invention comprises a small low profile conveyor which fills the gap between contiguous terminal end rollers of large conveyor that typically the end radius of belt segment. The transfer conveyor provides a driven belt bridge with a length that approximately bridges the space between terminal rollers of main conveyors and the belt segments that typically roll about them. The transfer conveyor has a low profile which minimizes any unsupported distance across which articles must cross between conveyor belt segments. The low profile transfer conveyor disclosed herein can transport conveyed articles across the gap between adjacent conveyor belt segments by providing a small continuous section of transfer conveyor having a belt which is driven across a bridging surface or transfer plate bounded on its two sides by small radius edges. In this manner the length of the transfer conveyor can extend almost to the surface of each terminal roller or belt segment on opposite sides of the gap that it bridges. At its ends, the transfer belt of the transfer conveyor may be stretched between a pair of pulleys having a larger diameter than the small diameter edges or thin outermost edges of the transfer conveyor which are located adjacent to the beginning of the curvilinear portion of the conveyor belt segment as defined by its terminal roller.

The belt surface of the transfer conveyor of this invention may have a horizontal or inclined orientation and may provide a flat or rounded surface. In most cases the belt surface will have a horizontal orientation and provide a flat surface. For convenience the rest of this preferred embodiment describes the transfer conveyor as having a flat surface with a horizontal orientation, however the invention may be practiced with a transfer conveyor oriented at any suitable angle to retain conveyed articles thereon with a flat or surface profile that suits the particular application.

Turning now to the Figures, it will be seen from FIGS. 1-3 that the transfer conveyor of the present invention, hereinafter referred to as transfer conveyor 10, comprises a first assembly 12 which may be defined as a low profile belt assembly 12. A transfer belt 14 of the belt assembly 12 is preferably made of light weight, food grade belting and will be seen to be continuous and to have the upper surface 13 and lower surface 15 configured into a relatively flat arrangement over a central base portion 32 that provides a transfer plate. The spacing between the upper and lower surfaces of the belt increase into an oval configuration by outwardly flaring the central portion of the transfer belt at its outboard ends 16 to provide drive sections. Within each of these drive sections 16 is bonded a an engagement surface in the form of a timing belt 18 including at least one guide section 20 along an interior surface 22 thereof, which at least one guide section 20 may be of a land in the form V-guide configuration, though this should not be construed as limiting. The at least one guide section 20 is useful for proper alignment of the timing belt 18 relative to a second functional assembly 30 of the conveyor 10 which may be defined as the mechanical body or belt carrying assembly 30.

Figure 2:
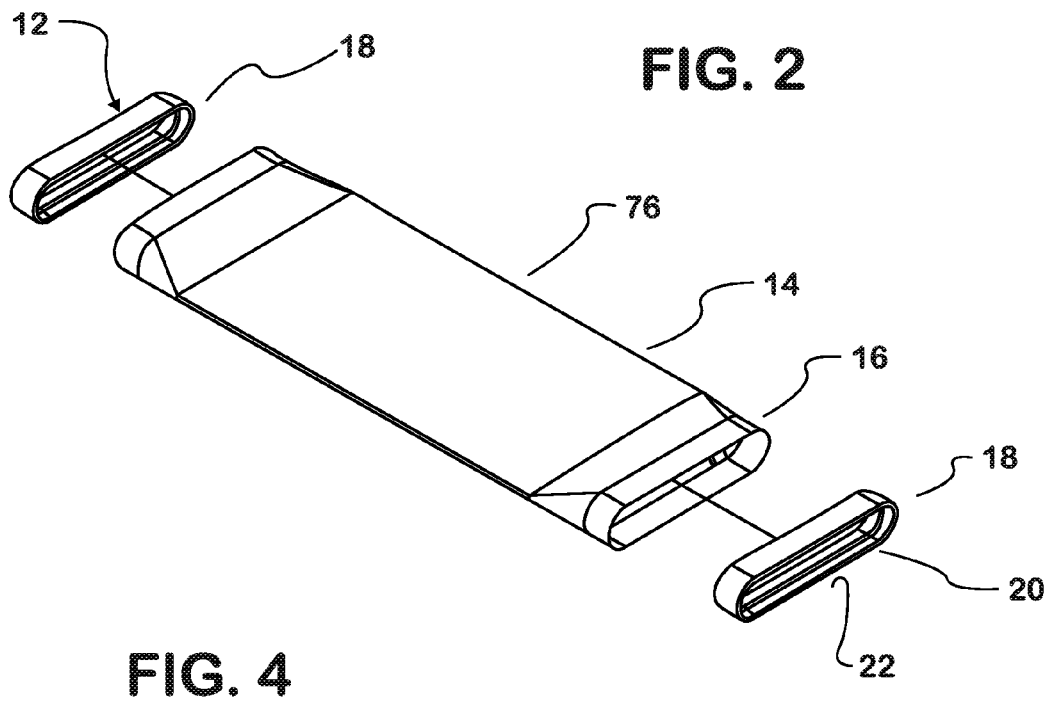
FIG. 2 provides an exploded perspective view of the low profile belt assembly of the low profile transfer conveyor for bridging multi segment conveyors of the present invention showing timing belts with guides which are bonded onto the interior of each flared end of the continuous belt of the belt assembly.

FIGS. 1 and 3 provide exploded perspective views of the transfer conveyor 10 including the belt assembly 12 as defined above and the mechanical body or belt carrying assembly 30. It will be understood that the belt carrying assembly 30 is assembled and located within the confines of the continuous belt 14 of the belt assembly 12. The belt carrying assembly 30 includes a base portion 32 in the form of a transfer plate which is of a width in a direction transfer to the movement of the belt that is greater of the belt assembly 12 and carries thereon the functional or mechanical structures of the transfer conveyor 10. In this respect, it will be seen that the base portion 32 includes two narrow end flanges 34 and 35 and further includes two elongate grooves 36, one within each elongate side edge 38 of a wider central portion 40 of the base portion 32.

The elongate grooves 36 along each side edge 38 of a wider central portion 40 each engage, in a tongue in groove manner, a static nose piece 42 the provides the belt, preferably made of a thermoplastic with a laterally outwardly narrowing lower outer peripheral edge 44 which acts as a further belt guide along the length of the belt 14 which travels there across as will be further described herein below. Each nose piece 42 may further include a cylindrical bore 47 extending lengthwise through the nose piece along a laterally extended inner edge 48 thereof through at least one of which extends a drive shaft 50, the cylindrical bore 47 acting as a bearing surface for the at least one drive shaft 50, as well as allowing for lateral dual drives, if desired.

The narrow end flanges 34 and 35 are each configured in sections, a first section 52 of each of which provides a belt tensioner for moving on or both of the nose pieces outwardly. As shown in the figures the belt tensioner may take the form of a low profile cam positioned centrally thereupon a low profile cam action belt tensioner 54 which is manually settable to maintain desired tension on the belt 14. To one side of one tensioner 54 on end flange 35 is fixedly mounted a dual drive pulley 56 which aids in belt 14 tracking and substantially eliminates twisting of belt 14. An inner end nub 58 of drive pulley 56 is fixedly engaged to a corresponding end of the drive shaft 50 extending through the cylindrical bore 47 in a nose piece 52. Drive pulley 56 is also provided with a drive shaft nub 62 which can be powered by any suitable means, such as direct belt drive, slave drive, etc. At the opposite end of the drive shaft 50, fixedly engaged to section 52 on end flange 34 is a driven pulley 60 which is driven by the drive shaft 50 to which it is engaged at an inner end nub 62 thereof. Also engaged to section 52 of both end flanges 34 and 35, on an opposite side of the cam tensioner 54, across from the pulleys 56 and 50 are mounted free spinning pulleys 66 which are mounted slidably within parallel tracks 68 for same inwardly of side edges 70 of the sections 52. They are slidably mounted so that the cam tensioner 54 can be set manually to act upon them as necessary to maintain appropriate tension on the belt 14 of belt assembly 12. Of course, they are mounted in alignment with the respective cooperating pulleys 56 and 60 as well. Thus, it will be understood that when the transfer conveyor 10 is fully assembled, the V-configured guide 20 of the timing belt 18 cooperates with a corresponding groove 71 on each of the pulleys 56, 60 and 66, maintaining proper tracking of the belt 14 and substantially eliminate twisting thereof. Each of the end flanges 34, 35 further includes a terminal portion 72 having a pair of laterally linearly aligned slots 74 therein which are provided. for engaging the transfer conveyor 10 to support structure 75 thereunder, as described in connection with FIGS. 6 and 7.

Figure 4:
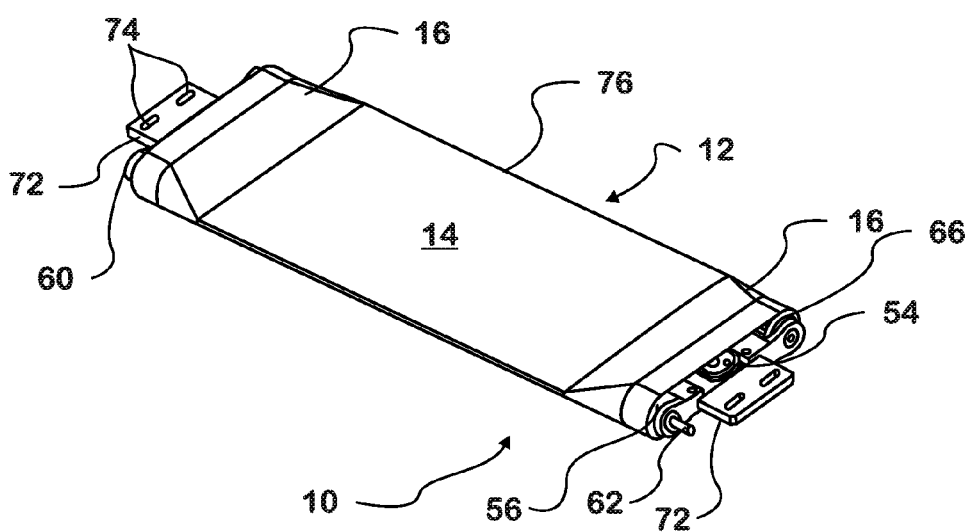
FIG. 4 provides a perspective view of the low profile transfer conveyor for bridging multi segment conveyors of the present invention in a completely assembled state with the mechanical body or belt carrying assembly seated within an interior cavity of the continuous belt assembly of the conveyor.

FIG. 4 illustrates the low profile bridging transfer conveyor 10 constructed and in its functional state, with the mechanical body or belt carrying assembly 30 appropriately seated within the continuous belt 14 of the belt assembly 12. In this configuration it is ready for use in bridging a gap 77 between contiguous ends 79 of multi sectional conveyor belts 80, as best illustrated in FIG. 5. It will be understood that the ends 79 are curvilinear, as defined by large diameter terminal rollers 81.

FIG. 5 illustrates a simplified lateral cross sectional view of the transfer conveyor 10 in its working environment, showing a low profile center section 76 thereof between the two flared outboard ends 16 being maintained substantially at the same level as the upper surface of the conveyor belts 80, in this case the same horizontal level, as the contiguous ends 79 of multi sectional conveyor belts 80 traveling around the large diameter terminal rollers 81. It will also be best seen here that the outwardly undercut lateral edge areas 44 of the side flanges 42 of the mechanical body 30 create a small radius for the low profile center section 76 along its lateral edges to allow for a smooth transition of product thereacross and onto the contiguous end portion 79 of next conveyor belt 80. It will also be understood that no structures such as drive rollers, sprockets, etc. are positioned beneath the transfer conveyor 10 in its preferred embodiment. It will also be understood by those skilled in the art that the low profile conveyor 10 is capable of bidirectional travel.

Figure 6:
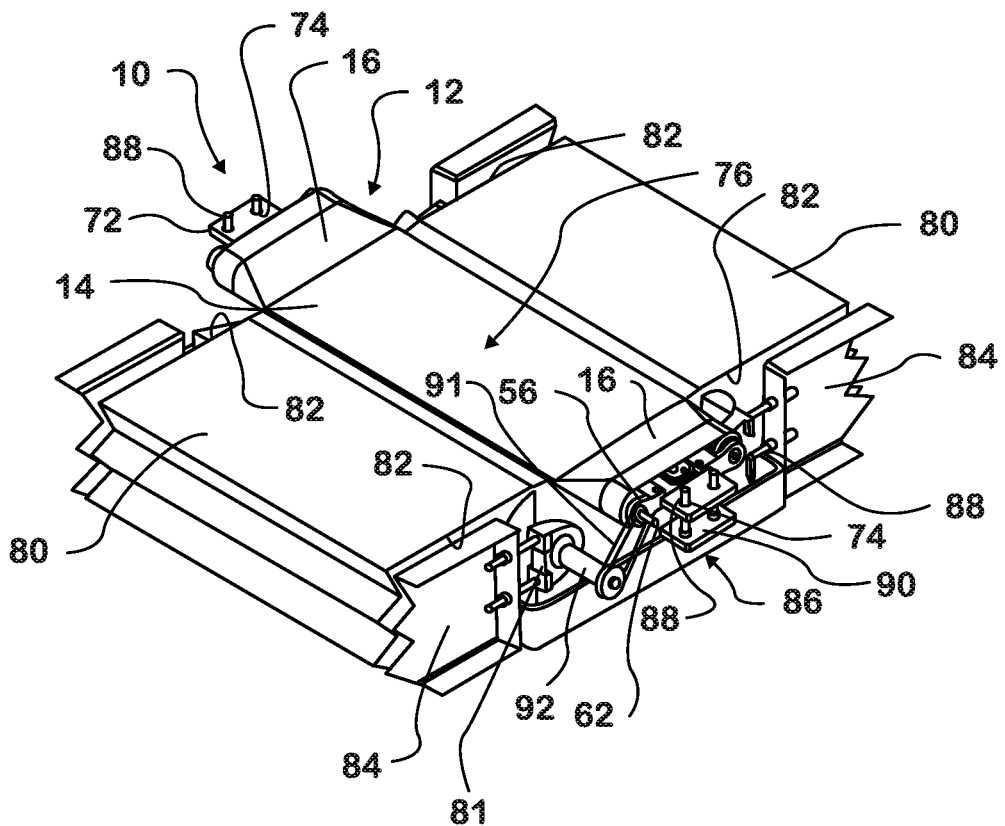
FIG. 6 provides a perspective view of the low profile transfer conveyor in its environment of use.
Figure 7:
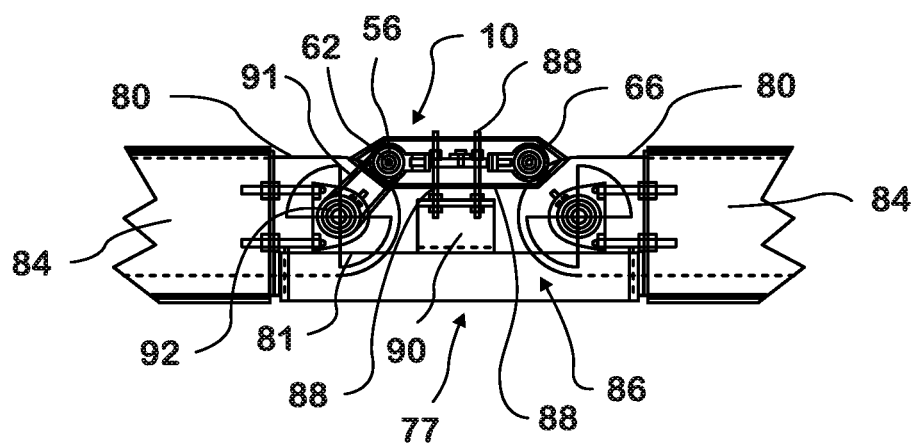
FIG. 7 provides an end view from the drive end of the low profile transfer conveyor in its environment of use.

Turning now to FIG. 6, it will be seen that the low profile center section 76 of transfer conveyor 10 extends substantially along an entire conveying dimension or width of contiguous belts 80 between which it is to transfer items from one to another over gap 77 there between. It will further be seen that the flared portion of outboard drive sections 16 of the transfer conveyor 10 extend beyond side edges 82 of the belts 80, acting somewhat like stop member shoulders to aid in maintaining product in travel there-along. Further, it will be understood that in a preferred embodiment, the transfer conveyor 10 may be fixed in position relative to the belts .80 which it is bridging. In this respect, frame sections 84 of the belts 80 may be engaged to a support member 86 of suitable configuration to which the transfer conveyor 10 may be engaged, preferably by threaded rods, bolts 88 or the like which allow for adjustment of height relative to the level of the belts 80. As there are many suitable embodiments for engagement of the transfer conveyor 10 between belts 80, the embodiment illustrated should be considered exemplary and not limiting to the teachings herein. As an example, the threaded, adjustable bolts 88 could be engageable to a support block 90 or the like for the transfer conveyor 10 by engaging through the laterally linearly aligned slots 74 in the terminal portions 72 of the end flanges 34, 35.

As further illustrated, the end nub 62 of the drive pulley 56 may be engaged by any suitable means such as belt or chain 90 to a hub 92 of an end roller 81 of one of the contiguous belts 80, so as to be driven thereby. This also is merely exemplary in nature as the belt can be driven by other means, as understood by those skilled in the art, as well.

As product passes from one to another of the belts 80 through use of the transfer conveyor 10, they are animated in travel thereacross, avoiding backups and the like and substantially maintaining all the product isolated to travel along the entire conveying dimension or width of the belts 80 by the rising shoulders of drive sections 16 created by the flaring at the outboard drive sections 16 of the transfer conveyor 10.

Figure 8:
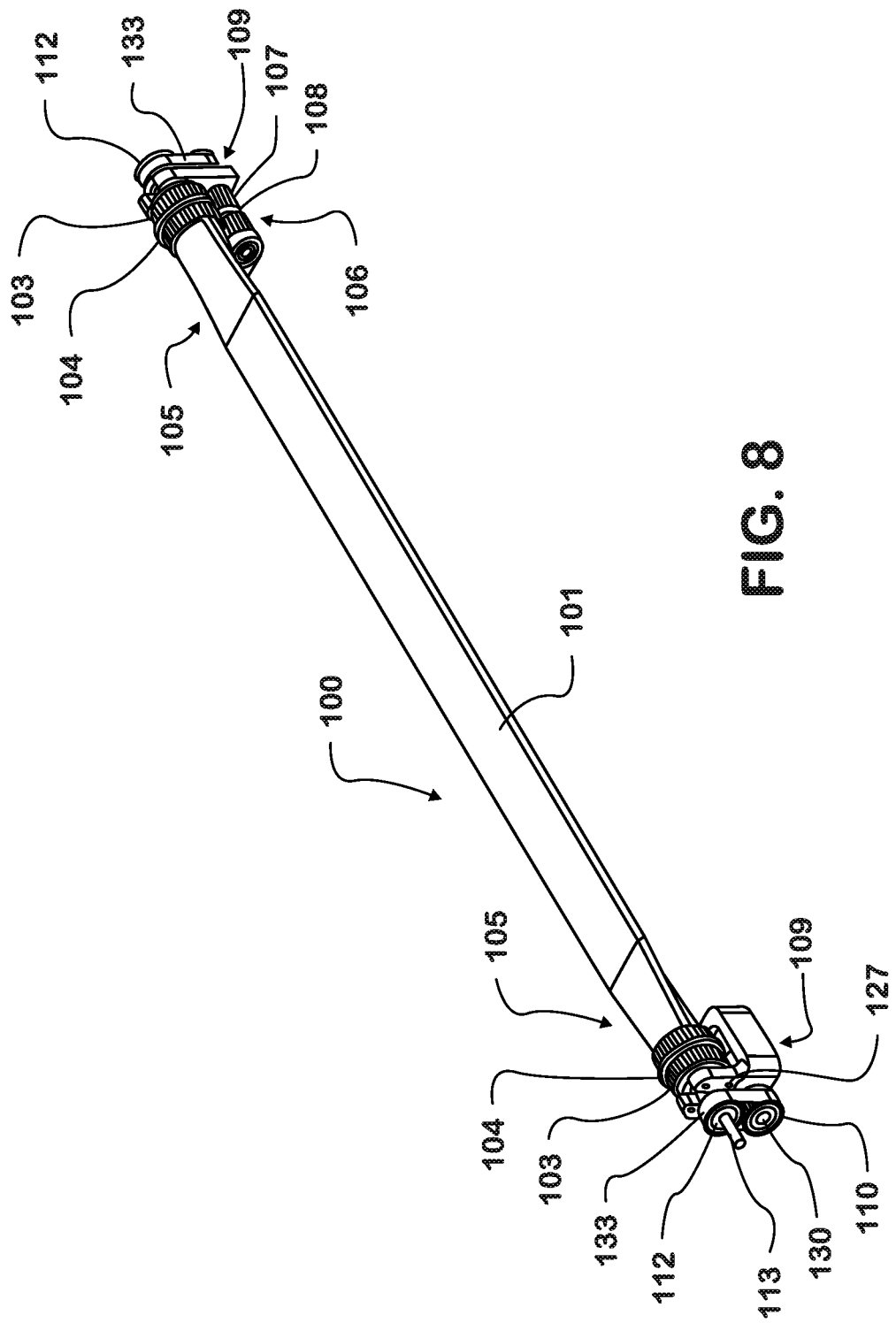
FIG. 8 shows a perspective view of another arrangement of the invention for driving the transfer belt.
Figure 9:
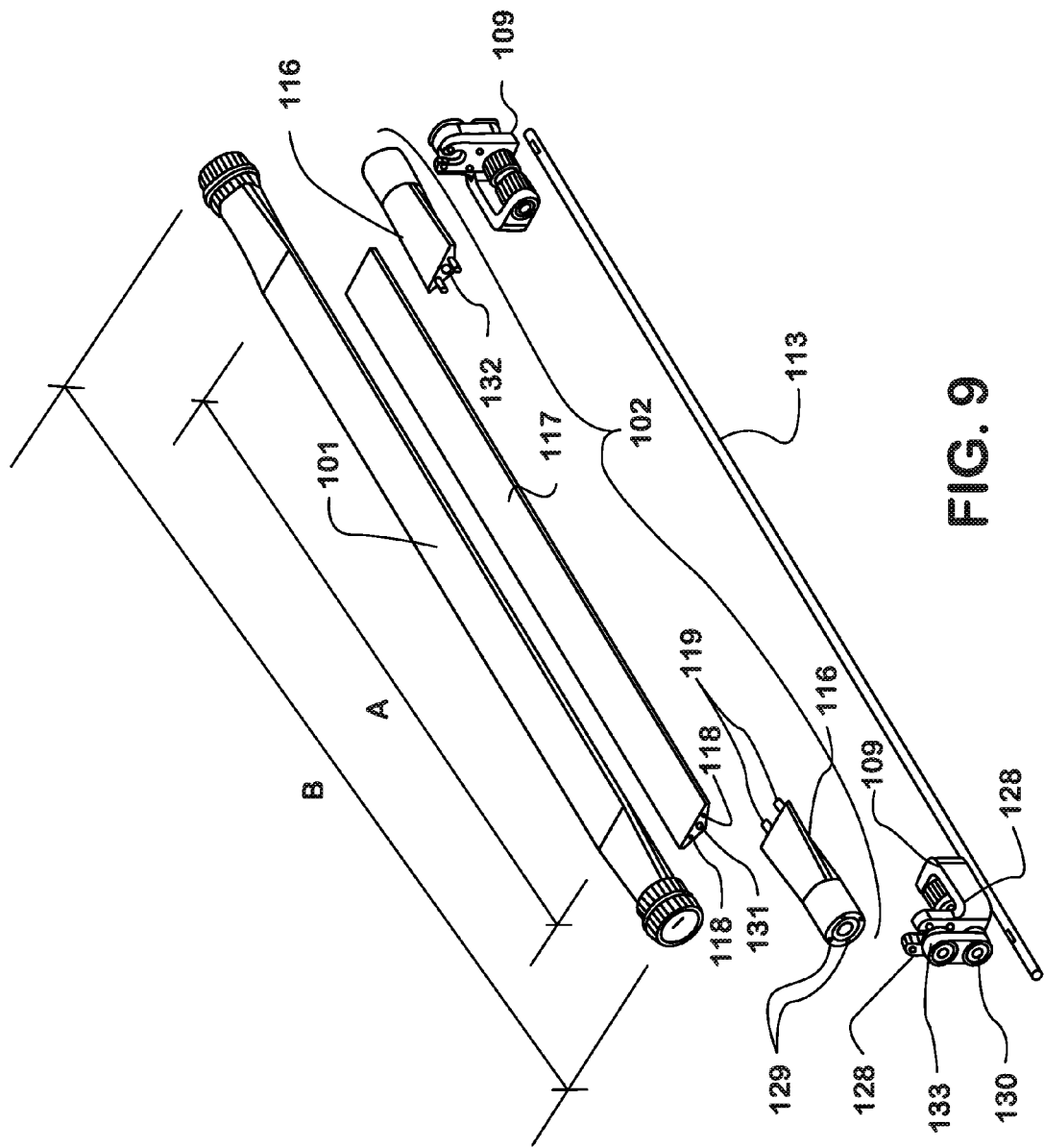
FIG. 9 is am exploded perspective view of arrangement of FIG. 8 showing the transfer belt removed from a transfer plate that retains the transfer belt.
Figure 10:
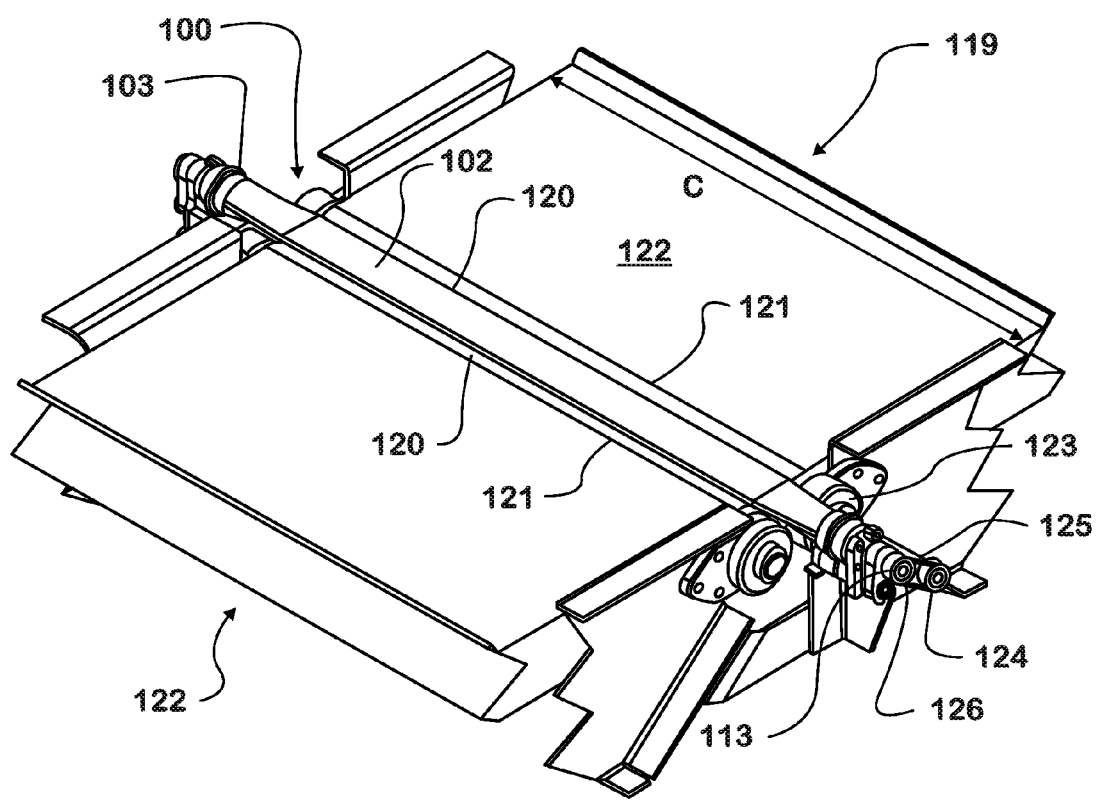
FIG. 10 shows the transfer conveyor of FIG. 8 in a position to transfer articles from one main conveyor to another main conveyor.
Figure 11:
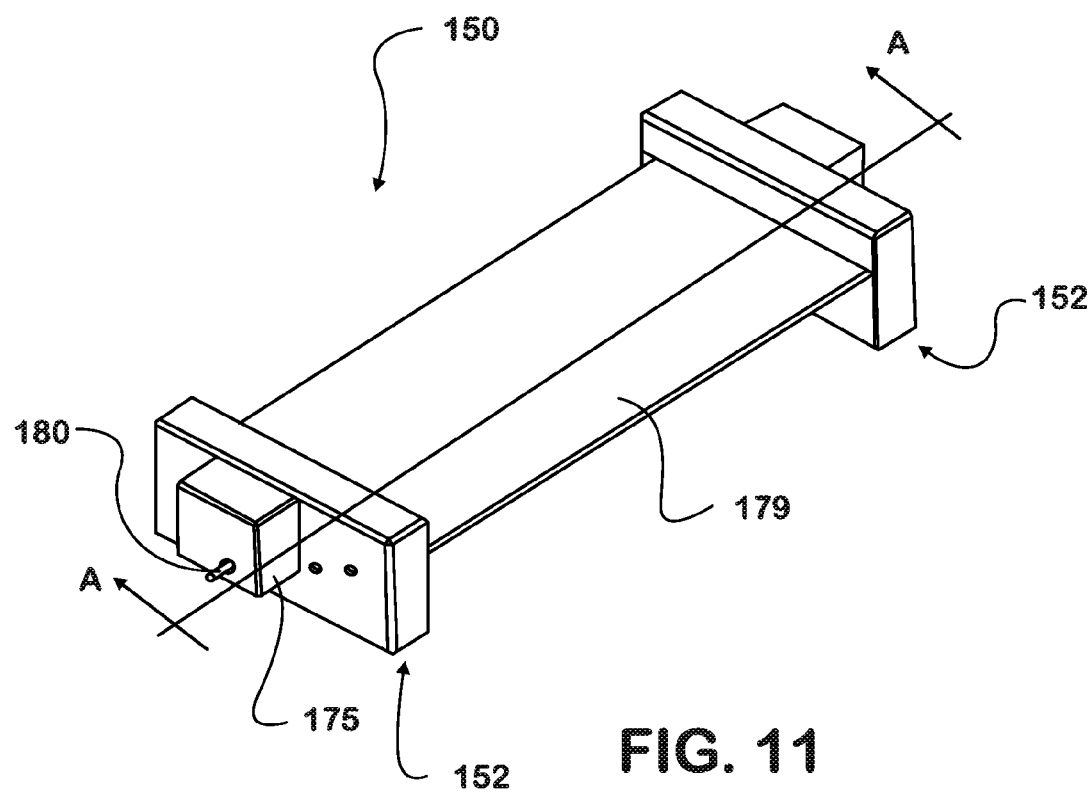
FIG. 11 is a perspective view of a transfer conveyor having a capture roller retained by the transfer plate.

FIGS. 8 to 10 show another form of the transfer conveyor. FIG. 8 shows a completely assembled transfer conveyor 100. Transfer conveyor 100 has a transfer belt 101 with drive sections 105 at its opposite ends. Drive sections 105 have a circular cross section and an engagement surface 103 having teeth on opposite sides of a guide land 104 extending outwardly therefrom.

As shown by removal of transfer belt in FIG. 9, transfer belt 101 wraps around and slides over transfer plate 102 and as it moves articles on along its upper surface. A central portion 117 is sandwiched between two transition portions 116 that when all assembled together make up transfer plate 102. Belt 101 and its drive sections 105 conform to the shape of transition portions 116 and central portion 117. By separating transition portions 116 from central portion 117 transfer belt 101 may first be slipped over central portion 117 and then transition portions 116 may be inserted into the belt and fixed to a central portion 117 by holes 118 that receive pins 119.

As shown by FIGS. 8 and 9 a drive roller 106 is fixed proximate each end of transfer plate 102 to drive the engagement surface 103 via teeth 107 formed thereon on to each side of a groove 108 that receives land 104. Plate bracket 109 rotatably retains each drive roller 106 via a gear shaft 130 that extends to the outboard side of plate bracket 109. Screws 127 extend through bracket holes 128 and engage threaded holes 129 at the end of each transition section 116 to secure plate brackets 109 in place about the ends of transfer plate 102. FIG. 8 shows an end view of a drive shaft 113 extending through pulley 112 for synchronizing the timing of drive pulleys 112 that are fixed about its outboard ends. FIG. 9 shows drive shaft 113 removed from shaft hole 131 in central portion 117 and shaft holes 132 in transition sections 116 through which it passes to extend to each side of transfer plate 102.

Drive shaft 113 transmits rotation to drive rollers 106 via a drive belt 133 that engages drive pulley 112 and driven pulleys 110 fixed at the outboard ends of gear shaft 130. Plate brackets 109 may be fixed with respect to any stationary object, in particular a main conveyor as previously described, to hold the transfer plate 102 in place with respect to a main conveyor or other destination for or source of conveyed articles. The drive shaft may be turned by any device that will rotate at the desired rate of revolutions. Electric drive motors or mechanical coupling to an end roller as previously described are suitable ways of turning the input shaft at a desired rate. FIG. 9 shows the total length of the transfer belt 101 with its transverse dimension B which extends to the outside of transition sections 116 and its transfer dimension A which in this case is shorter than the transverse dimension B (but may be the same as the transverse dimension in other arrangements as shown in FIGS. 11-18.)

FIG. 10 depicts transfer conveyor 100 positioned between two main conveyors 119 and 122. The outermost edges 120 of the transfer conveyor extend almost to the beginning of the line 121 that indicates the transition of conveyor belt 122 from a flat to a rounded surface created by terminal roller 123. In this particular arrangement terminal roller 123 is coupled to a roller pulley 124 that via a belt 125 turns an input pulley 126 drive fixed to shaft 113 and keeps transfer belt 102 moving at the same speed as conveyor belt 122.

In FIG. 10 the transfer dimension C of the main conveyor 119 is the same as the transfer dimension A of the transfer conveyor 100. FIG. 10 also shows how the conveyance distance along main conveyor 119 (i.e. the direction of travel of the conveyor belt 122) is much greater than the conveyance distance across transfer belt 102.

FIGS. 11 to 14 show a transfer conveyor 150 which is another form of transfer conveyor having a transfer belt 179 and a slide plate and at least one captured roller as hereinafter described. The transfer conveyor is suitable for positioning ahead and/or behind main conveyors in the manner hereinbefore described. A cover assembly 152 located at each end of transfer belt 179 covers the drive apparatus that receives rotary input via the end of a drive shaft 180 that extends out of one or both of cover assemblies 152 for moving the belt and conveying articles. Drive shaft 180 may be driven to impart motion to transfer belt 179 in any manner including those previously described.

Figure 12:
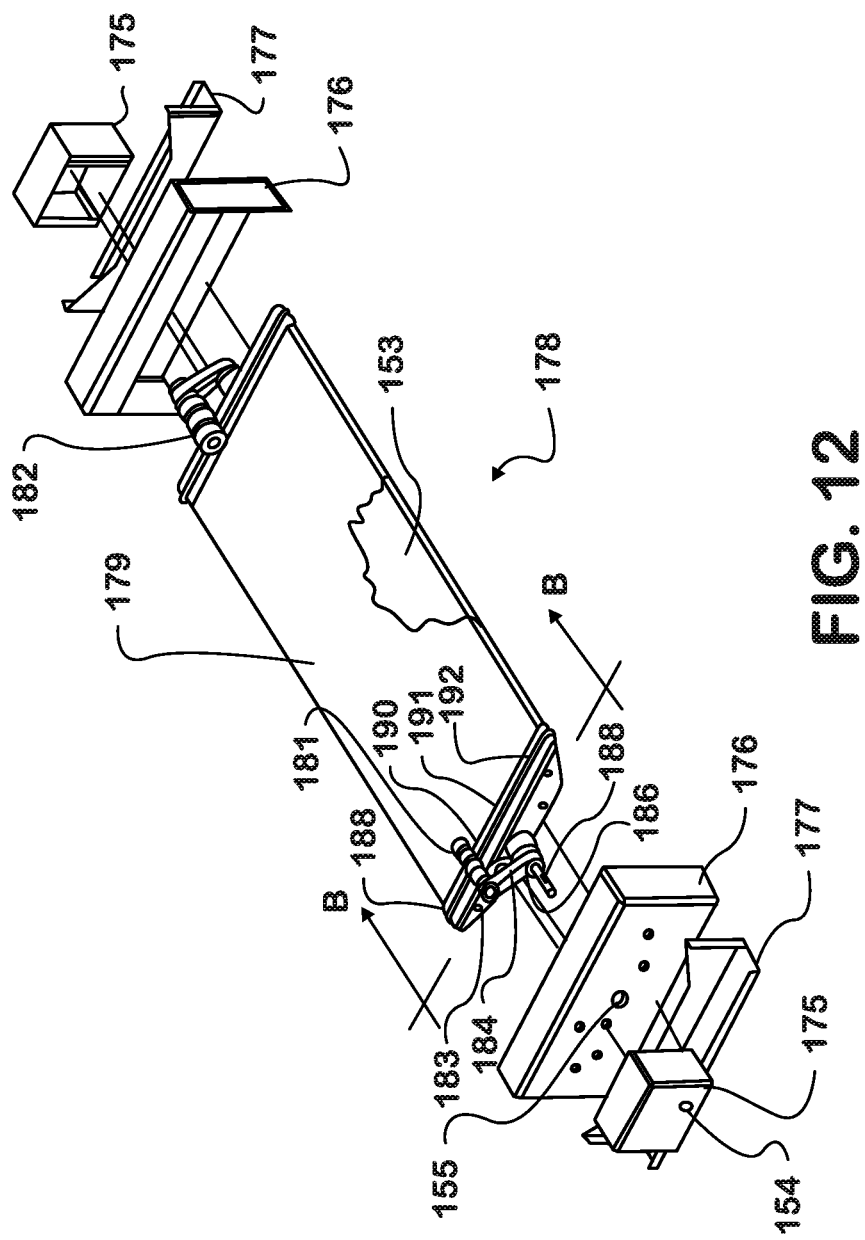
FIG. 12 is an exploded view of the transfer conveyor of FIG. 11.
Figure 13:
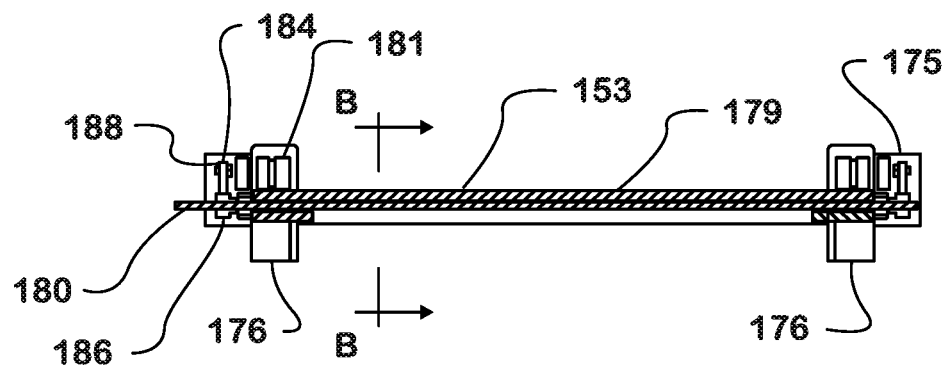
FIG. 13 is a section view taken at A-A of FIG. 11.

FIG. 12 shows cover assemblies 152 in exploded view and separated from a remaining assembly 178 comprising the rest of transfer conveyor 150. Cover assemblies 152 include a pulley cover 176, shaft cap 175 and support bars 177. The driven end of drive shaft 180 extends through holes in 154 and 155 in the respective shaft covers. FIG. 12 shows shaft caps 175, pulley covers 176 and support bars 177 removed from assembly 178 that contains transfer belt 179, slide plate 153, drive shaft 180, end plate 183 and drive rollers 181, 182. End plate 183 rotatably retains drive shaft 180 and a shaft pulley 186 that turns drive roller 181 via a drive pulley 188 fixed thereto and a belt 184. Drive pulley 181 has teeth that engage corresponding teeth on an engagement surface 191 of transfer belt 179 and also includes a land 192 that that fits into a corresponding groove 190 to maintain alignment of the transfer belt 179. As shown in FIG. 12 and FIG. 13 (FIG. 13 shows Section A-A of FIG. 11), drive shaft 180 extends through transfer plate 153 to drive pulley 182 in a similar manner.

Figure 14:
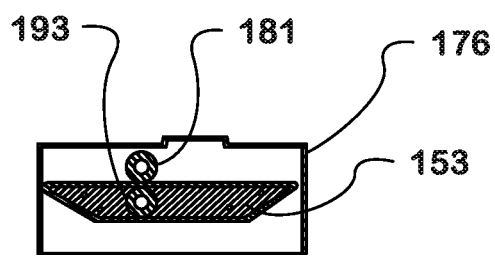
FIG. 14 is a section view taken at B-B of FIG. 13

FIG. 14 shows, via Section B-B taken in FIG. 13, that drive roller 181 acts together with a pinch roller 193 to keep drive roller 181 fully engaged with engagement surface 191 of transfer belt 179. End plate 183 rotatably retains pinch roller 193 in a slot or pocket defined by slide plate 153. Drive roller 181 and/or pinch roller 183 may be fixed with respect to end plate 183; preferably at least one of these roller or more preferable both of the rollers are biased toward the engagement surface to increase the pressure thereon between these two rollers.

FIGS. 15 to 18 show another arrangement for the transfer conveyor to be used in the manner of the previously described transfer conveyors. This type of transfer conveyor locates or traps one or more of its rollers in a pocket defined by the transfer plate. In other examples of this type of transfer conveyor rollers and corresponding pockets may extend fully or partially across the transfer plate and may be located anywhere over the surface of the transfer plate as long as the roller size and position does not inhibit the close positioning of the transfer conveyor with respect to an associated main conveyor.

Transfer conveyor 200 has a transfer plate 201 over which a transfer belt 203 (shown partially in FIG. 15) can slide and that has a drive roller 202 that extends across the entire transverse length of transverse plate 201. The outer surface of drive roller 202 can contact transfer belt 203 across its entire width. Drive roller 202 has teeth 204 at both ends to engage an engagement surface on the transfer belt in the manner previously described except that in this arrangement the engagement surface and its corresponding teeth extend around the inside of the transfer belt.

As shown in FIGS. 15 and 17, a groove 205 separates teeth 204 and aligns with a groove 206 that extends around the periphery of the transfer plate at both of its ends. The groove receives a corresponding land on the engagement surface of the transfer belt.

Adjustment plates 208 fixed to transfer plate 201 at both of its ends retains adjustment screws 207 in threaded holes to raise or lower shaft blocks 211 that rotatably retains drive shaft 210 to set the position of drive roller 202 with respect to the surface of transfer plate 201. One or more guide pins 210, fixed to each adjustment plate 208, extend through each shaft block and into a respective pin sleeve 209 to maintain the alignment of the drive roller in a pocket 212 that extends the length of the transverse plate 201 and in which drive roller 202 resides. In addition to positioning drive roller 202 with respect to the top surface of transfer plate 201, extending or retracting the adjustment screw 207 moves drive roller 202 into or away from transfer belt 203 to increase or decrease its tension and can withdraw drive roller 201 completely out of contact with belt 203.

As shown in FIGS. 15 to 18 a tensioning roller 213 is retained in a pocket 214 by shaft blocks 211' that rotatably retain a tensioner shaft 215 about which tensioning roller 213 turns. Pocket 214 opens to the opposite face of transfer plate 201 relative to pocket 212. Except for operation as a tensioner, tensioning roller 213 functions in essentially the same manner and is positioned and retained in essentially the same manner as drive roller 202. Some of its similarly functioning components include: adjustment plates and screws 207' and 208', shaft blocks 211' that retain tensioner shaft 215. Again raising or lowering adjustment screw 207' with set the position of tensioning roller 213 with respect to the bottom surface of transfer plate 201 and increase or decrease the tension in transfer belt 203.

Transfer conveyor 200 may include one or more additional rollers that are trapped in pockets and may extend fully or partially over the length of the transfer conveyor. The additional rollers may be drive rollers, tensioning rollers or rollers that simply reduce friction between transfer belt 203 and transfer plate 201. Preferably the transfer conveyor will have at least one additional tensioning roller to provide additional control on the tightness of transfer belt 203 about the slide plate. and may increase the engagement of the drive roller with the transfer belt. Preferably at least one additional roller is also provided on a surface of the transfer plate opposite a drive roller.

As depicted and described above, the transfer conveyor of this invention provides a number of advantages, some of which have been described above and others of which are inherent in the invention. Also, modifications may be proposed without departing from the teachings herein. Accordingly the scope of the invention is only to be limited as necessitated by the accompanying claims.

The invention claimed is:

1. A low profile transfer conveyor for bridging a gap between contiguous ends of conveyor belts of a multi segment conveyor system, the transfer conveyor comprising a belt assembly including a continuous belt and a mechanical assembly received in part within the belt assembly for use in producing motion of the continuous belt of the belt assembly, wherein the belt assembly comprises a low profile central section that provides a transversely extending outermost edge and at least one outwardly extended end having a circular cross section that provides an engagement surface wherein the low profile central section is suitable for having at least a portion of its outermost edge extended transversely along the width of the conveyor belts it is to bridge, and wherein the mechanical assembly comprises a transfer plate extending at least partially into the belt to support the continuous belt and to form the shape of the outermost edge portion of the central section, and at least one drive roller capable of rotating relative to the transfer plate that causes rotation of the continuous belt about the circular cross section by interaction with the engagement surface to translate the continuous belt over the transfer plate.

2. The low profile transfer conveyor of claim 1 wherein the belt assembly comprises outwardly flaring ends on each side of the low profile central section of the belt assembly that each extend over an outwardly flared end of the transfer plate and at least one of the outwardly flared ends of the transfer plate is separable from an unflared portion of the transfer plate for sliding the continuous belt over the unflared portion.

3. The low profile transfer conveyor of claim 2 wherein the outwardly extending ends act as stop member shoulders along end edges of the transfer conveyor for keeping product in line with the low profile central section of the belt for transport from one conveyor belt segment to another.

4. The low profile transfer conveyor of claim 3 wherein the transfer plate of the mechanical assembly carries along each side edge thereof a thermoplastic static nose piece with a laterally outwardly narrowing lower outer peripheral edge.

5. The low profile transfer conveyor of claim 4 wherein the mechanical assembly has at least one drive roller, located on each side of the drive belt that engages the circular cross section of the belt to keep the belt moving uniformly over its width across the transfer plate and a drive shaft connects drive rollers at opposite ends of the conveyor.

6. The low profile transfer conveyor of claim 1 wherein at least one of the drive rollers is in the form of a roller that defines a groove or a land and the engagement surface defines the other of a groove or land and the groove and land are arranged to cooperate to the keep the continuous belt positioned with respect to the low profile central section.

7. The low profile transfer conveyor of claim 1 wherein the transfer conveyor is fixed to a support for same extending between end supports of the conveyor segments it is to bridge.

8. The low profile transfer conveyor of claim 1 wherein at least one drive roller is mechanically linked to the multi-segment conveyor system to keep the translational speed of the continuous belt equal to the translational speed of at least one belt in the multi-segment conveyor system.

9. The low profile transfer conveyor of claim 1 wherein the transfer conveyor is fixed to a support for same extending between end supports of the conveyor segments it is to bridge with an adjustable fastener arrangement that allows adjustment of the height at which the transfer conveyor is positioned.

10. A low profile transfer conveyor for bridging a gap between contiguous ends of conveyor belts of a multi segment conveyor system, the transfer conveyor comprising a belt assembly and a mechanical assembly received in part within the belt assembly for use in producing motion of the belt of the belt assembly, the belt assembly comprising a continuous belt having a low profile central section that provides an outermost edge that extends transversely and outward cylindrically shaped ends with the low profile central section adapted to have the outermost edge extend transversely along an entire width of the conveyor belts the low profile conveyor is to bridge and an engagement surface extending around the cylindrically shaped end of the belt, and the mechanical assembly comprising a transfer plate that extends into the belt to support the belt assembly and to form the shape of the outermost edge, and a drive roller that rotates the engagement surface for causing translation of the low profile central section of the continuous belt about the transfer plate.

\* \* \* \* \*